March 29, 1932. O. C. RALSTON 1,851,594
METALLURGY OF COMPLEX ORES
Filed Sept. 25, 1929
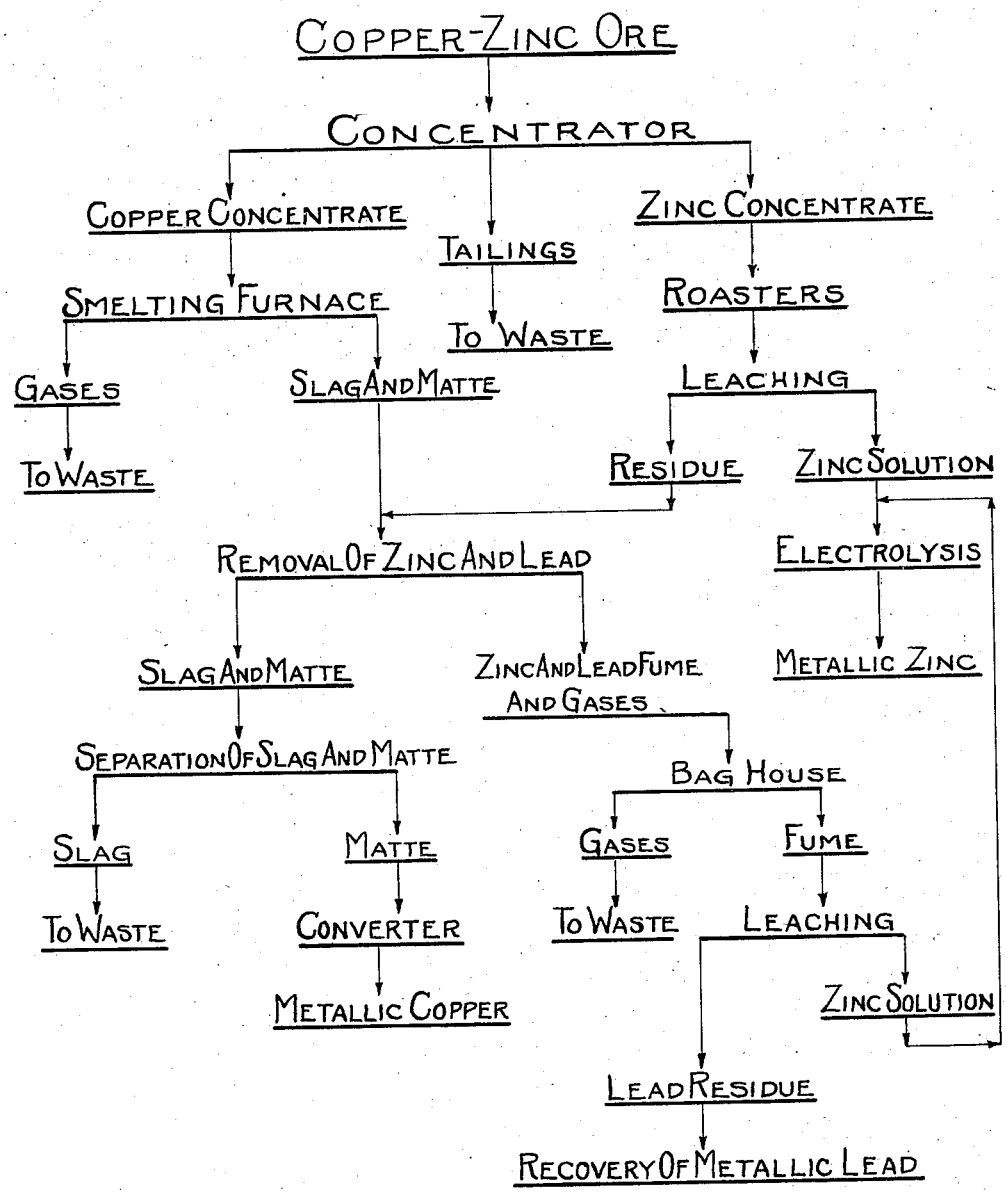
INVENTOR
OLIVER C. RALSTON
BY
ATTORNEYS Patented Mar. 29, 1932

1,851,594

UNITED STATES PATENT OFFICE

OLIVER C. RALSTON, OF CLARKDALE, ARIZONA, ASSIGNOR TO UNITED VERDE COPPER COMPANY, OF CLARKDALE, ARIZONA, A CORPORATION OF DELAWARE

METALLURGY OF COMPLEX ORES

Application filed September 25, 1929. Serial No. 395,183.

This invention relates to the metallurgy complex of ores and has for an object the provision of an improved process for recovering the metal values from such ores. More particularly, the invention contemplates the provision of an improved process for treating complex copper-zinc ores and for recovering the copper and zinc and associated valuable metals such as lead, gold and silver.

According to some present practices, mixed copper and zinc ores are subjected to differential flotation operations or other concentration processes for the purpose of obtaining separate concentrates consisting largely of copper and zinc. However, present commercial concentration processes are not capable of effecting a complete separation of copper and zinc minerals, and, consequently, the copper concentrate contains some zinc minerals, and the zinc concentrate contains some copper minerals. The lead, gold, and silver minerals will be found with one or the other of the concentrates. As a general rule, the copper and zinc in the ore constitute the major values, and all recovery efforts are directed primarily toward obtaining as complete as possible separation of the zinc and copper minerals in order that the two concentrates may be treated separately and independently to recover the copper and zinc in suitable commercial forms. Usually the zinc together with any lead contained in the copper concentrate is lost, the copper concentrate being treated only for the purpose of recovering copper and any gold and silver which is not slagged off or otherwise eliminated in carrying out the reduction of the copper minerals.

In carrying out the concentrating operation, it is essential that great care be used in order that the best separation at the lowest cost may be made. Under even the best possible working conditions, the separation is relatively costly, and, as a result of the effort which must be made to effect a complete separation, it is impossible to avoid the inclusion of undesirable minerals and gangue in the concentrates. These undesirable minerals and gangue materials not only increase the cost of smelting or otherwise treating the concentrates, but, also, complicate the procedures used.

The present invention contemplates the provision of a process by means of which recoveries of all of the valuable metals may be increased substantially, and in which the extreme care required in carrying out certain steps of the present customary processes may be eliminated.

According to the process of the present invention, the ore containing copper and zinc and associated minerals is concentrated to produce two grades of concentrates, one consisting chiefly of zinc minerals and the other consisting chiefly of copper minerals. A large proportion of any lead minerals contained in the ore is found usually in the copper concentrate, and iron, silver and gold minerals are found to some extent in both concentrates. The copper concentrate contains some zinc mineral, and, likewise, the zinc concentrate contains some copper mineral. The zinc concentrate also contains some lead mineral, if lead minerals are present in the ore.

The copper concentrate is subjected to a smelting operation, and, simultaneously the zinc concentrate may be subjected to a suitable process for recovering metallic zinc. During the smelting of the copper concentrate, a molten bath of copper matte and slag is formed. Any lead present will be found almost entirely in the matte, and the zinc is distributed rather evenly between the matte and slag. The slag and matte are treated to recover the zinc and lead. After the zinc and lead have been removed, the slag is discarded and the treatment of the copper matte is then carried on to produce metallic copper. The zinc product obtained from the slag and matte is joined with the zinc concentrate for treatment or with a product of some step of the process for treating the zinc concentrate. The lead product is likewise subjected to suitable treatment for the recovery of lead. The treatment of the zinc and lead minerals and products is continued, preferably, until metallic zinc and metallic lead are produced. Any copper, lead, gold and silver contained in the zinc concentrate are discarded in some form of residue during the carrying out of the process for the recovery of zinc. The residue may contain small amounts of copper, zinc, lead, gold, and silver, and it is combined for treatment with the slag and matte obtained from smelting the copper concentrate. During the subsequent treatment of the slag and matte, the zinc and lead added in the residue will be removed and returned to the zinc and lead recovery processes. The copper, gold and silver will be retained in the matte, the copper being recovered in subsequent converting and refining operations, and the gold and silver being recovered during the copper refining operations.

The process of the invention may be so regulated that the valuable metals may be recovered either in metallic form or in a suitable relatively concentrated form with the discarding of solid waste products at one point only subsequent to the concentrating step and prior to the recovery of gold and silver in metallic forms. The excessive loss of metals occasioned by discarding waste products at several different points is thus eliminated. Imperfection of metal separation in any one step is corrected in succeeding steps.

The invention will be better understood from a consideration of the accompanying flow sheet in conjunction with the following description of one of the complete processes which may be carried out in accordance with the invention.

In applying the process of the invention to the treatment of a sulfide ore containing copper, zinc, iron, lead, gold and silver, the ore, preferably, is concentrated by means of a differential froth flotation process to recover separate concentrates one containing most of the copper mineral and the other containing most of the zinc mineral. The lead, gold and silver minerals will be found in both concentrates. The flotation process is carried out with a view to rejecting as large a portion of the iron as possible without disturbing the recovery of other valuable minerals.

The copper concentrate is treated in a copper smelting furnace to produce a molten bath of slag and matte which is treated in a de-zincing converter by injecting a reducing agent. The lead, silver and gold will be found largely in the matte while the zinc will be rather evenly distributed between the matte and slag. The injection of the reducing agents into the molten bath will cause reduction of the lead and zinc compounds and volatilization of the resulting metallic lead and zinc. Air under pressure is introduced above the bath to oxidize the volatilized products and the resulting fume containing the oxidized products is passed to a bag house and collected for subsequent treatment.

After the removal of the zinc and lead, the molten bath is passed to a settler for the purpose of eliminating a portion of the slag. The remaining slag and matte are transferred to a converter and treated, if desired, to produce a blister copper product suitable for electrolytic refining. The silver and gold values may be recovered in the sludge from the electrolytic cells. The disposal of the de-zinced and de-leaded slag and matte is immaterial to my process as they are freed of complicating factors and can be disposed of by any known method.

The zinc concentrate is preferably subjected to an oxidizing roast during which a small amount of zinc sulfate is formed and during which the copper is converted to insoluble copper ferrite. The product of the roasting treatment is leached with dilute sulfuric acid to form a solution of zinc sulfate. The zinc sulfate solution is treated electrolytically to obtain metallic zinc.

The mixed zinc and lead product from the de-zincing converter is also treated to produce a zinc sulfate solution which may be added to and treated with the zinc sulfate solution obtained from the leaching of the roasted zinc concentrate. The mixed zinc and lead product from the de-zincing converter is leached with sulfuric acid, the zinc product being converted to soluble zinc sulfate and the lead product being converted to insoluble lead sulfate which settles to the bottom of the leaching vat.

The lead sulfate is sent to a lead smelter or leaching plant and treated to produce metallic lead.

The residue remaining over from the leaching of the roasted zinc concentrate is added to the molten bath in the copper smelting furnace or in the de-zincing process. It contains copper, silver, gold and lead as well as unleached zinc compounds.

The roasting operation on zinc concentrate is expensive and always imperfect. The provision of the above described sequence of operations allows use of a cheaper roast and leaving more insoluble zinc in the residue because the subsequent treatment in the copper smelting furnace and de-zincing converter make up for the shortcomings of the roast and leach. Likewise, the shortcomings of the concentration into separate copper and zinc concentrates are corrected by this method of operation and permit simpler and more economical concentration to be practiced. In fact, grades of concentrate can be produced which would normally be classed as non-commercial.

As an example of how my method of treatment compares to former methods of ore treatment, the following data on United Verde mine ore can be cited:

The differential flotation of the ore gave the following products:

| Product | Wt. % | Assays | | | | |
|---|---|---|---|---|---|---|
| | | % Cu | % Zn | Oz/T Ag | Oz/T Au | % Pb |
| Heading | 100 | 2.00 | 7.0 | 1.30 | 0.03 | 0.30 |
| Copper conct | 10 | 15.00 | 8.0 | 9.10 | .18 | 2.4 |
| Zinc conct | 13 | 2.75 | 42.2 | .80 | .023 | .6 |
| Tailing | 77 | .18 | .8 | .14 | .01 | .01 |

| Product | Wt. % | Recoveries | | | | |
|---|---|---|---|---|---|---|
| | | % Cu | % Zn | % Ag | % Au | % Pb |
| Heading | 100 | 100 | 100 | 100 | 100 | 100 |
| Copper conct | 10 | 75 | 11 | 70 | 60 | 80 |
| Zinc conct | 13 | 18 | 79 | 15 | 10 | 27 |
| Tailing | 77 | 7 | 9 | 15 | 30 | 3 |

The usual method of disposing of the two concentrates is to send the copper concentrate to a copper smelter where all its zinc content and its lead content are lost. The zinc concentrate is sent to an electrolytic zinc plant where at best an 80% recovery of the zinc is made, and the residue from the zinc plant is smelted in a copper furnace for recovery of the copper, silver and gold, while any zinc and lead in it would be lost. By the introducing of the dezincing converter into the copper smelter to treat both slag and matte and following out the method of operation of my invention, 80% of the zinc and lead loss normally suffered in treatment of the two concentrates may be eliminated. Furthermore, the dezincing process is effective in removing zinc sulfide and magnetite from the slag and thus provides better settling conditions so that an increased copper, silver and gold recovery takes place in the matte.

Assuming a normal copper smelter recovery to be 95% of the copper, silver and gold; an 80% electrolytic zinc plant recovery from concentrate and 95% from zinc-lead fume, the following table shows the comparative metal recoveries by the old standard methods and by my new method.

| | Standard methods | Improved method |
|---|---|---|
| Copper recovery | 88.3 | 90 |
| Zinc recovery | 63.0 | 83.5 |
| Silver recovery | 80.7 | 83 |
| Gold recovery | 66.5 | 68 |
| Lead recovery | None | 79 |

The above recoveries are based on the concentrator heading and when recalculated to the weight of the two concentrates only the advantages of my improved method are even more clearly apparent.

I claim:—

1. The method for treating ores containing copper and zinc which comprises treating the ore to obtain separate concentrates of copper and zinc, smelting the copper concentrate to produce a molten bath of slag and matte, treating the molten bath to recover any zinc contained therein, and treating the zinc thus recovered and the zinc concentrate to recover metallic zinc.

2. The method for treating ores containing copper and zinc which comprises treating the ore to obtain separate concentrates of copper and zinc, smelting the copper concentrate to produce a molten bath of slag and matte, treating the molten bath to recover any zinc contained therein, and treating the zinc thus recovered and the zinc concentrate in an electrolytic process.

3. The method for treating ores containing copper and zinc which comprises treating the ore to obtain separate concentrates of copper and zinc, subjecting the copper concentrate to a heat treatment to form a molten bath, treating the molten bath to recover any zinc contained therein, treating the bath to recover metallic copper, and treating the zinc product obtained from the molten bath together with the zinc concentrate to recover metallic zinc.

4. The method of treating an ore containing zinc and copper which comprises treating the ore to obtain separate zinc and copper concentrates, subjecting the copper concentrate to a heat treatment to produce a molten bath of slag and matte, subjecting the molten bath to the action of a reducing agent to obtain a zinc product, treating the matte to obtain metallic copper, and treating the zinc product together with the zinc concentrate to obtain metallic zinc.

5. The method of treating an ore containing copper and zinc which comprises subjecting the ore to a differential flotation operation to obtain separate copper and zinc concentrates, subjecting the copper concentrate to a heat treatment to produce a molten bath of slag and matte, subjecting the molten bath to the action of a reducing agent to obtain a zinc product, treating the matte to obtain metallic copper, and treating the zinc product together with the zinc concentrate to obtain metallic zinc.

6. The method of treating ore containing copper and zinc which comprises treating the ore to obtain separate concentrates of copper and zinc, treating the zinc concentrate to obtain metallic zinc and a residue containing copper, and smelting the zinc residue and copper concentrate to recover any zinc contained therein.

7. The method of treating ore containing copper and zinc which comprises treating the ore to obtain separate concentrates of copper and zinc, treating the zinc concentrate to obtain metallic zinc and a residue containing copper, heating the copper concentrate and zinc residue to produce a molten bath, and subjecting the molten bath to the action of a reducing agent to obtain a zinc product.

8. The method of treating ore containing copper and zinc which comprises treating the ore to obtain separate concentrates of copper and zinc, subjecting the zinc concentrate to an oxidizing roast, leaching the roasted product to obtain a zinc solution, and treating the residue from the leaching operation with the copper concentrate to recover any zinc contained therein.

9. The method of treating ore containing copper, zinc and lead which comprises treating the ore to obtain separate concentrates of copper and zinc, heating the copper concentrate to produce a molten bath, treating the molten bath to recover a mixed zinc and lead product, leaching the zinc and lead product to obtain a zinc solution, and treating the residue from the leaching operation to recover lead.

10. The method of treating ore containing copper, zinc and lead which comprises treating the ore to obtain separate concentrates of copper and zinc, treating the zinc concentrate to obtain metallic zinc and a residue containing copper, heating the copper concentrate and zinc residue to produce a molten bath, treating the molten bath to recover a mixed zinc and lead product, leaching the zinc and lead product to obtain a zinc solution, and treating the residue from the leaching operation to recover lead.

11. The method of treating complex copper-zinc sulphide ore which comprises subjecting the ore to successive flotation operations to obtain a copper concentrate containing the major portion of the copper sulphide and some zinc sulphide and a zinc concentrate containing the major portion of the zinc sulphide and some copper sulphide, smelting the copper concentrate to produce matte and a zinc oxide product, subjecting the zinc concentrate and the zinc oxide product to a hydrometallurgical operation to produce metallic zinc and a copper-bearing residue, smelting the residue with the copper concentrate, and treating the matte to produce metallic copper.

12. The method of treating complex copper-zinc sulphide ore which comprises subjecting the ore to successive flotation operations to obtain a copper concentrate containing the major portion of the copper sulphide and some zinc sulphide and a zinc concentrate containing the major portion of the zinc sulphide and some copper sulphide, smelting the copper concentrate to produce a molten bath, injecting a reducing agent into the molten bath to separate a zinc product, treating the remainder of the molten bath for the recovery of metallic copper, subjecting the zinc concentrate and the zinc product to a hydrometallurgical operation to produce metallic zinc and a copper-bearing residue, and smelting the residue with the copper concentrate.

13. The method of treating complex copper-zinc sulphide ore which comprises subjecting the ore to successive flotation operations to obtain a copper concentrate containing the major portion of the copper sulphide and some zinc sulphide and a zinc concentrate containing the major portion of the zinc sulphide and some copper sulphide, smelting the copper concentrate to produce slag and matte, treating the slag and matte to obtain a zinc oxide product, roasting the zinc concentrate, leaching the roasted product and the zinc oxide product with a sulphuric acid solution to obtain a zinc sulphate solution and a copper-bearing residue, recovering metallic zinc from the zinc sulphate solution by electrolysis, smelting the copper-bearing residue with the copper concentrate, and treating the matte to produce metallic copper.

In testimony whereof I affix my signature.

OLIVER C. RALSTON.